US005653291A

United States Patent [19]
Sundholm

[11] Patent Number: 5,653,291
[45] Date of Patent: Aug. 5, 1997

[54] PRESSURE ACTIVATED VALVE FOR FIRE FIGHTING INSTALLATION

[76] Inventor: Göran Sundholm, Ilmari Kiannon kuja 3, FIN-04310 Tuusula, Finland

[21] Appl. No.: 500,960
[22] PCT Filed: Feb. 14, 1994
[86] PCT No.: PCT/FI94/00058
§ 371 Date: Aug. 9, 1995
§ 102(e) Date: Aug. 9, 1995
[87] PCT Pub. No.: WO94/17857
PCT Pub. Date: Aug. 18, 1994

[30] Foreign Application Priority Data

Feb. 15, 1993 [FI] Finland ............... 930663

[51] Int. Cl.⁶ ............................................. A62C 35/68
[52] U.S. Cl. ............................................. 169/20; 137/113
[58] Field of Search ............................... 169/19, 20, 21, 169/22, 60; 137/112, 113

[56] References Cited

U.S. PATENT DOCUMENTS

| | | | |
|---|---|---|---|
| 3,860,073 | 1/1975 | Willms | 169/20 |
| 4,073,464 | 2/1978 | Hansen et al. | 251/26 |
| 4,109,726 | 8/1978 | Hansen et al. | 169/11 |

FOREIGN PATENT DOCUMENTS 10465  4/1980  European Pat. Off. .

*Primary Examiner*—Andrew C. Pike
*Attorney, Agent, or Firm*—Ladas & Parry

[57] ABSTRACT

A valve for a fire fighting installation has a housing, an inlet into the housing and connectable to a source of extinguishing liquid at a high pressure, an outlet from the housing and connectable to an outgoing line having at least one automatically releasable spray head, and a connection in the housing for passing liquid between the inlet and outlet. A spindle in the housing is movable between a standby position, in which the spindle closes the connection, and an activated position, in which the spindle opens the connection. A liquid space in the housing and connectable to a secondary source of extinguishing liquid at full and lesser pressures that both are lower than the high pressure of the extinguishing liquid of the source applies the lower pressures to the spindle in a direction toward the standby position of the spindle. A channel in the housing connects the outlet to the liquid space and a spring applies a force to the spindle in a direction opposite to the direction of the pressures of the liquid space. The pressures of the secondary source and the force of the spring are mutually adapted in such a way that, when the secondary source acts with the full pressure, the spindle is held in the standby position and, when the secondary source acts with the lesser pressure, the spring drives the spindle to the activated position.

6 Claims, 2 Drawing Sheets

PRESSURE ACTIVATED VALVE FOR FIRE FIGHTING INSTALLATION

BACKGROUND OF THE INVENTION

The present invention relates to a valve for a fire fighting installation and, in particular, for a fire fighting installation operating with a high drive pressure of extinguishing liquid. A high pressure in this context means a pressure within the range of about 30 bar to about 300 bar, whereas conventional low pressure installations have an operating pressure of about 5–10 bar. The source for the extinguishing liquid preferably is at least one hydraulic accumulator connected to the outgoing line of the installation to which a number of automatically releasable spray heads are connected.

Known high pressure valves are expensive and, in most cases, electrically operated, which is a drawback in fire situations.

SUMMARY OF THE INVENTION

The object of the invention is to provide a new valve which is reliable without access to electric current and is of a simple structure and, thus, cheap.

The valve according to the invention is characterized by a housing, an inlet into the housing and connectable to a high-pressure extinguishing-liquid source, an outlet from the housing and connectable to an outgoing line, and a spindle which is movable in the housing between a standby position in which the spindle closes a connection in the housing from the inlet to the outlet, and an activated position in which the spindle opens the connection from the inlet to the outlet. The housing has a channel, which connects the outlet to a liquid space that is under the influence of liquid pressure from a secondary liquid source with a lower pressure than said high pressure source. The spindle is arranged to be under the influence of the force of a spring that acts in the opposite direction from the pressure influence in said liquid space on the spindle. The pressure of the secondary liquid source and the force of said spring are mutually adapted in such a way that, when the secondary liquid source acts with full pressure on the spindle via said liquid space, the spindle is held in the standby position and, when the pressure of the secondary liquid source has decreased to a predeterminable value due to liquid delivery to a released spray head, the spring drives the spindle to the activated position.

A nonreturn valve is preferably positioned in the channel of the valve housing. In the activated state, the valve prevents the pressure of the high pressure source from entering said liquid space.

BRIEF DESCRIPTION OF THE DRAWINGS

In the following, the invention is described with reference to an exemplifying preferred embodiment shown in the attached drawings.

DESCRIPTION OF THE PREFERRED EMBODIMENT

Figure 1:
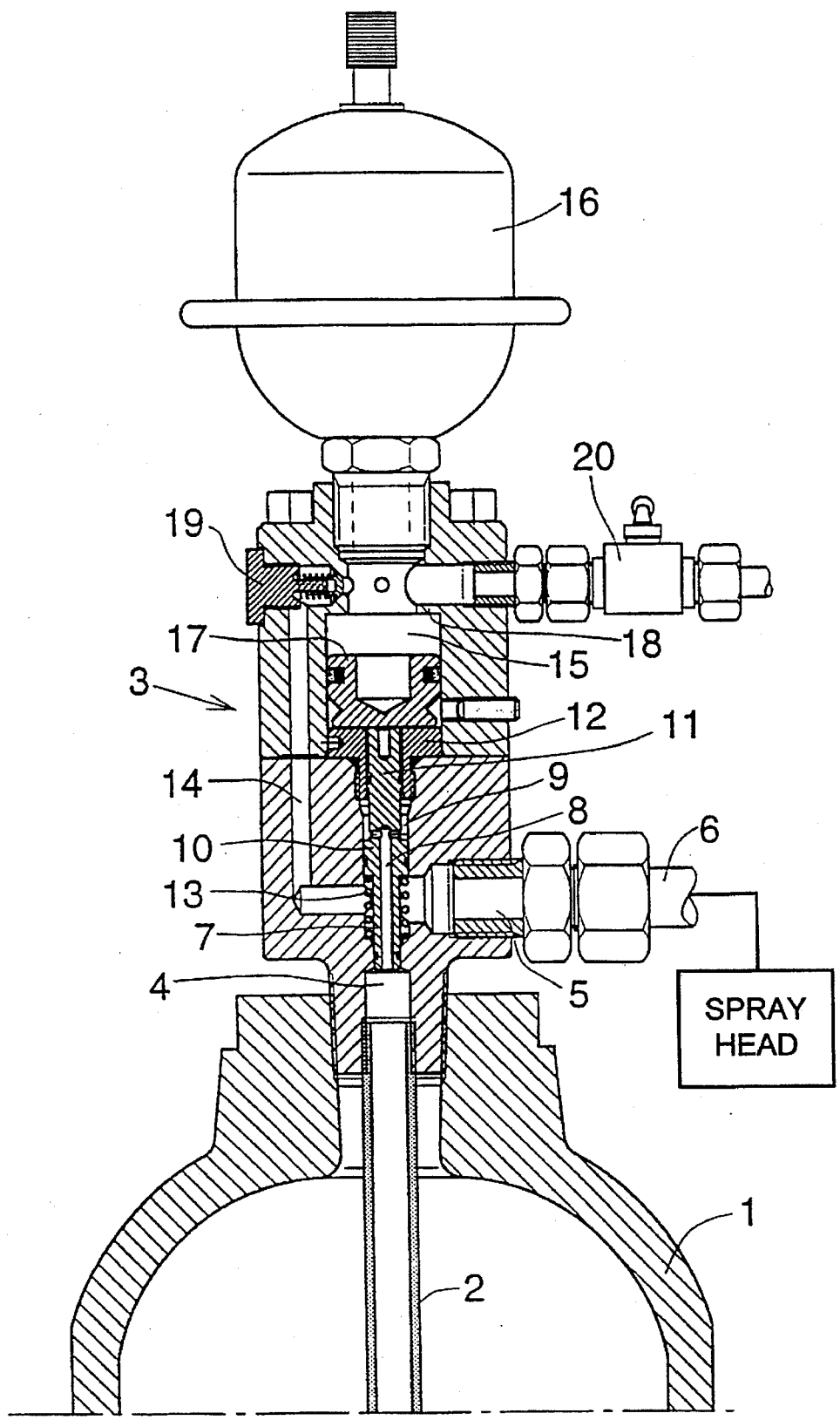
FIG. 1 is an elevational view, partly in cross section, showing a valve in a standby state.

A hydraulic accumulator 1 with a high charge pressure (e.g., 200 bar) is called in the following the primary accumulator. It has an outlet tube 2 which, preferably, is provided with a number of apertures in its wall in order to deliver first liquid and then a mixture of liquid and the drive gas of the accumulator as described in Finnish patent application Ser. No. 924752.

A valve housing 3 has an inlet 4 connected to the tube 2 and an outlet 5.

The outlet 5 is connected to an outgoing line 6 having a number of automatically releasable spray heads, only one being shown in the drawing.

In the standby position of the valve 3 shown in FIG. 1, a connection between the inlet 4 and the outlet 5 is closed by one end of a valve spindle 7.

The valve spindle 7 has a channel 8 starting from the inlet 4 and leading to an annular space 9 axially between the spindle and the surrounding valve housing. The cross-sectional area of an end face of a piston-like part 10 of the spindle 7 in the annular space 9 is equal to that of the part of the spindle 7 at the inlet 4, which is under the influence of the pressure of the hydraulic accumulator 1. The pressure action of the primary accumulator 1 on the spindle 7 is thus reversed (i.e., compensated or balanced) by the pressure action in the annular space 9 in the opposite direction against the end face of the piston-like part 10 of the spindle. The pressure in the primary accumulator 1 thus cannot move the spindle 7.

An opposite end portion 11 of the spindle is axially movable through a fixed support element 12 of the valve housing in sealed gliding contact.

A helical spring 13 is laid around the spindle 7 and is supported at one end at inlet 4 and on the opposite end against the piston-like part 10 of the spindle. The spring 13 thus tries to move the spindle 7 upwards in FIG. 1 from the standby position in which the spindle keeps the connection from the inlet 4 to the outlet 5 closed.

The valve housing 3 has a channel 14, which connects the outlet 5 to a liquid space 15. The liquid space, in turn, is connected to a small (e.g., about 0.3 liter) hydraulic accumulator 16 with a low charge pressure (e.g., 6–10 bar). The hydraulic accumulator 16 is called in the following the secondary accumulator.

The end portion 11 of the valve spindle 7 at least lies against one side of a head 17. The head 17 is movable in the liquid space 15 like a piston between the position in FIG. 1, in which the one side of the head 17 presses against the fixed support element 12 of the valve housing 3 and the spindle 7 closes the connection from the inlet 4 to the outlet 5, and the position in FIG. 2, in which the opposite side of head 17 presses against a stop 18 of the valve housing 3 and the spindle 7 opens the connection from the inlet 4 to the outlet 5.

In FIG. 1, the spindle 7 is kept in the place shown by the pressure in the liquid space 15, which acts on the spindle head 17. The spring 13 acts in the opposite direction, while the high pressure in the primary accumulator 1, as earlier mentioned, does not drive the spindle 7.

When a spray head on the outgoing line 6 connected to the outlet 5 is released, the secondary accumulator 16 starts delivering liquid to that spray head. As a result, the pressure in the liquid space 15 falls quickly, the push action of the spring 13 on the spindle 7 becomes greater than the pressure, and the spindle starts moving upwards from its position in FIG. 1 to the end position in FIG. 2, against the stop 18.

Figure 2:
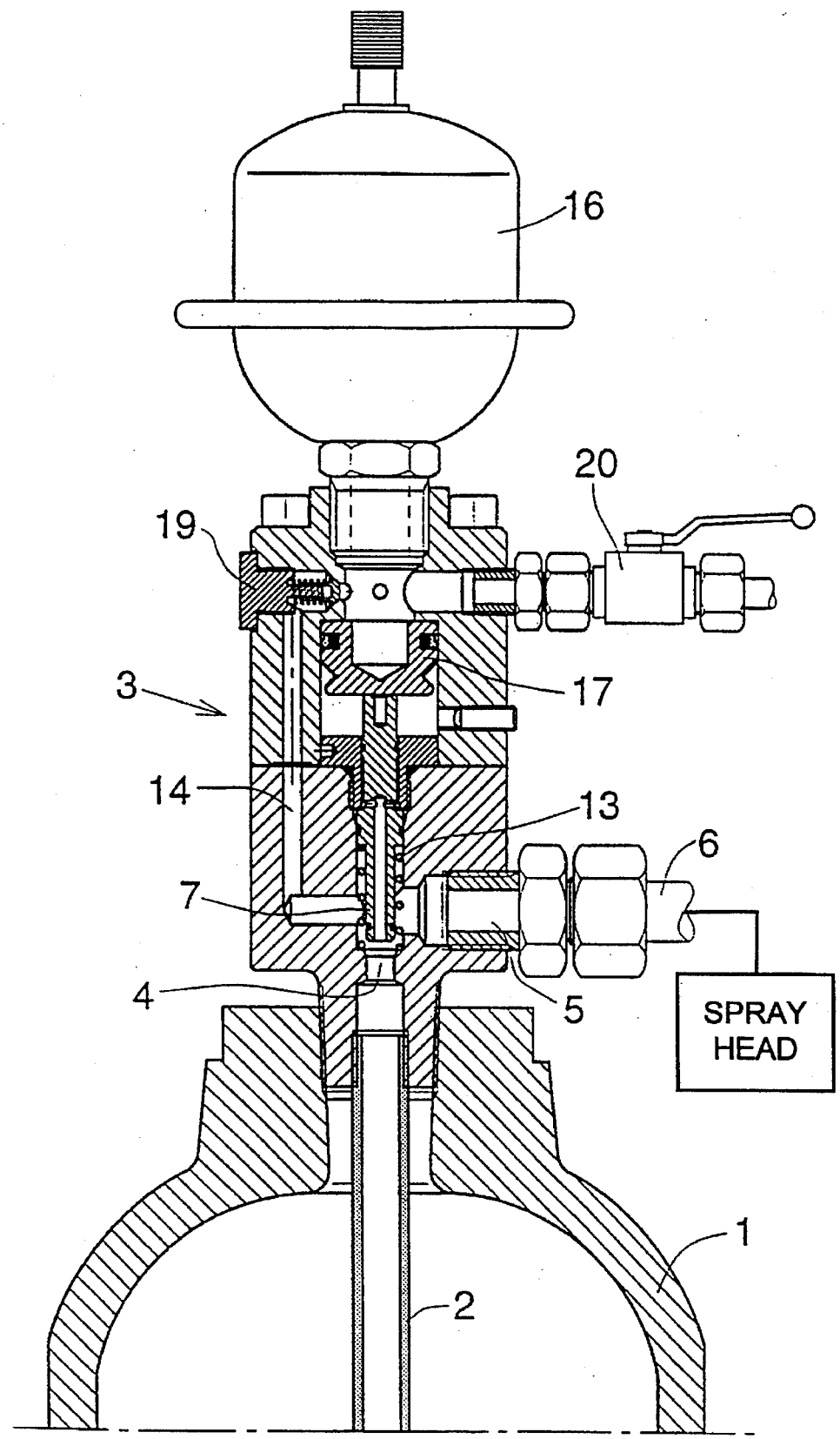
FIG. 2 is an elevational view, partly in cross section, showing the valve in an activated state.

A nonreturn valve 19 in the channel 14 prevents the pressure of the primary accumulator 1 from entering the liquid space 15 when the spindle 7 is in the position shown in FIG. 2.

A manually operable pressure-release means 20 is in a closed position in FIG. 1 and an opened position in FIG. 2.

For larger installations the invention can of course be applied to any number of hydraulic accumulators and/or high pressure pumps. With respect to spray heads, nozzles, group release, and other arrangements, these can be as described, e.g., in the International Patent Applications PCT/FI92/00060, . . . /00122, . . . /00155, . . . /00156, . . . /00193, . . . /00213, . . . /00316, . . . /00317, and . . . /00330 (publications WO 92/15370, WO 92/19324, WO 92/20453, WO 92/20454, WO 92/22353, WO 93/00962, WO 93/1860, WO 93/10859, and WO 93/10861, respectively).

I claim:

1. A valve for a fire fighting installation, said valve comprising:

a housing;

an inlet (4) into the housing and connectable to a source (1) of extinguishing liquid at a high pressure;

an outlet (5) from the housing and connectable to an outgoing line having at least one automatically releasable spray head;

a connection in the housing for passing liquid between the inlet and the outlet;

a spindle (7) in the housing for movement between a standby position, in which the spindle closes the connection, and an activated position, in which the spindle opens the connection;

a liquid space means (15) in the housing and connectable to a secondary source (16) of extinguishing liquid at full and lesser pressures that both are lower than the high pressure of the extinguishing liquid of the source (1) at the high pressure for applying the lower pressures to the spindle (7) in a direction toward the standby position of the spindle (7);

a channel (14) in the housing and connecting the outlet to the liquid space means (15); and spring means (13) for applying a force of a spring to the spindle (7) in a direction opposite to the direction of applying the lower pressures of the liquid space means (15), wherein the pressures of the secondary source (16) and the force of the spring means (13) are mutually adapted in such a way that, when the secondary source (16) acts with the full pressure, the spindle (7) is held in the standby position and, when the secondary source (16) acts with the lesser pressure, the spring means (13) drives the spindle (7) to the activated position.

2. The valve according to claim 1, and further comprising:

a nonreturn valve means (19) in the channel (14) for preventing the high pressure of the source (1) from entering the liquid space means (15).

3. The valve according to claim 1, and further comprising:

one end on the spindle (7) for the closing of the inlet (4) in the standby position, the one end being under the influence of the high pressure;

an opposite end of the spindle (7) for defining an axis of the spindle between the one and opposite ends of the spindle;

a piston-like part (10) of the spindle (7) projecting transversely to the axis of the spindle intermediately between the one and opposite ends of the spindle, an area of the piston-like part of the spindle being equal to a cross-sectional area of the one end of the spindle;

an annular space (9) between the spindle (7) and the housing at the piston-like part of the spindle; and an axial channel (8) in the spindle (7) from the one end to the annular space (9) in order to compensate for pressure action in the inlet with oppositely directed pressure from the inlet in the annular space against the piston-like part (10) of the spindle.

4. The valve according to claim 3, wherein:

the spring is a helical spring laid around the spindle (7) with one end of the helical spring supported against the housing at the inlet (4) and an opposite end of the helical spring supported against the piston-like part (10) of the spindle.

5. The valve according to claim 4, and further comprising:

a support element (12) fixed in the housing for gliding support of a portion (11) of the spindle (7) axially between the piston-like part and the opposite end of the spindle during the movement of the spindle; and a head (17) movably in the liquid space means (15) like a piston by abutment with the opposite end of the spindle.

6. The valve according to claim 1, wherein:

the secondary source (16) is a hydraulic accumulator.

* * * * *